United States Patent Office 3,419,490
Patented Dec. 31, 1968

3,419,490
REACTOR FOR ACETYLENE PRODUCTION FROM HYDROCARBON GASES BY ELECTROCRACKING IN DIRECT CURRENT
Nicolae Petrescu and Leo Knall, Bucharest, Rumania, assignors to Ministerul Industriei Chimice, Bucharest, Rumania, a firm
Continuation-in-part of application Ser. No. 418,818, Dec. 16, 1964. This application July 18, 1967, Ser. No. 654,207
Claims priority, application Rumania, Jan. 20, 1964, SN 47,414
10 Claims. (Cl. 204—323)

ABSTRACT OF THE DISCLOSURE

This invention relates to a novel improved reactor for acetylene production from hydrocarbon gases by electrocracking them by means of a direct current.

The reactor of the invention comprises a preferably cylindrical chamber through which the hydrocarbon gases, which are used as a raw material, pass at high speeds. A pair of vertical electrodes extends from opposite sides of the cylindrical chamber. An electric arc is formed between these electrodes during operation of the device and is discharged into the hydrocarbon gases, thereby converting at least a portion of these gases into acetylene. The upper electrode of the device is supported on the cylindrical chamber by, at least, one layer of insulating material having no refractory characteristics. A cylindrical jacket is vertically, adjustably mounted on the lower horizontal wall of the cylindrical chamber. An annular opening is formed between the upper edge of the cylindrical jacket and the upper horizontal wall of the chamber. A slide valve is mounted in the gas inlet pipe of the reactor for adjusting the gas flow thereto.

Cross reference to related application

This application is a continuation-in-part of our copending abandoned application Ser. No. 418,818, filed Dec. 16, 1964, for "Reactor for Acetylene Production from Hydrocarbon Gas by Electrocracking in Direct Current."

Background of the invention

Several commercial processes are known in the petrochemical industry for producing acetylene from hydrocarbon gases. All of the known processes require the heating of the hydrocarbon gases to elevated temperatures (1300–1400° C.) in a relatively short time and, subsequently, the quick cooling thereof so that the total reaction time is less than $\frac{1}{100}$ second. Thus, for example, when methane gas is used as raw material, the reaction is as follows: $2CH_4 \rightarrow C_2H_2 + 3H_2 - 91$ Kcal., which constitutes an intensive endothermic reaction. Consequently, it can be stated that generally large quantities of thermal energy are required for producing acetylene. This large heat energy is not only necessary for effecting the reaction but also the heating of the hydrocarbon gases to reaction temperature.

The production processes for acetylene can be classified according to the source of heat used in the process. The device of this invention employs electrocracking (an electric arc) as the source of heat for bringing about the reaction.

When electrocracking is used for bringing about the reaction, the necessary heat energy is supplied by an electric arc which discharges between two oppositely mounted electrodes, between which the hydrocarbon gases pass.

The best known commercial processes employing electrocracking for the production of acetylene are used at the plants of C. W. Hüls in Germany and the so-called "Schoch Process" in the United States of America.

The reactors used in the prior art have the drawbacks of not being sufficiently adjustable so as to provide the optimum reaction conditions for various hydrocarbon gases that may be used as raw materials in the same reactor. Furthermore, the known reactors generally use as electrical insulators refractory material, such as, for example, special porcelains, which are difficult to be manufactured, are brittle, and can be easily damaged.

Summary of the invention

It is a primary object of this invention to eliminate the aforementioned drawbacks of the reactors of the prior art.

In the reactor forming part of this invention, direct (rectified) current is used in the order of magnitude of several thousand volts. Mercury rectifiers of the reversible type are used for supplying the necessary voltage and power in the order of several thousand kw.

The electric arc that is formed between the electrodes of the reactor is generally about 1 meter in length. With the exception of its contacting ends, the electric arc is of very small thickness, that is in the order of a few millimeters, and the acetylene is formed in the annular space around the electric arc. The hydrocarbon gases which pass through the reactor are thus transformed into reaction gases containing approximately 13–17% acetylene, in addition to hydrogen, depending on the type of reacted hydrocarbon gases, the power of the electric arc traversing said gases etc.

The reactor of this invention comprises preferably a cylindrical chamber, at opposite sides of which there are mounted two vertically extending, preferably tubular electrodes. The latter are surrounded by water cooling jackets, having a plurality of coils mounted therein for increasing the velocity of the cooling liquid, which renders a very efficient cooling system, having a high heat-transfer coefficient. A cylindrical jacket is vertically, movably mounted inside the reaction chamber and determines the width of an annular inlet for the hydrocarbon gases.

The upper electrode is supported by a disc of insulating material having no refractory properties, which forms part of the cover for the reaction chamber. The upper electrode is open at its upper end. In the event the voltage of the electric current which is delivered to the rectifiers is smaller than the voltage required for producing the electric arc in the reactor, a portion (up to 10% of the total input) of the hydrocarbon gases can be introduced through said open electrode. This introduction of the hydrocarbon gases through the electrode favors the formation of the electric arc, which therefore requires a lower input voltage, which is independent of the total gas input. The electric connections to the electrodes, as well as the hydraulic connections to the water cooling jackets are disposed in and or formed as rubber hoses.

The reactor is provided with an inlet pipe for the hydrocarbon gases, in which there is mounted an adjustable slide valve.

In the following description those forms of the invention will be outlined in full, which are selected for illustration in the accompanying drawings.

Brief description of the drawings

The drawings illustrate diagrammatically one embodiment of the reactor for acetylene production incorporating the present invention.

Figure 1:
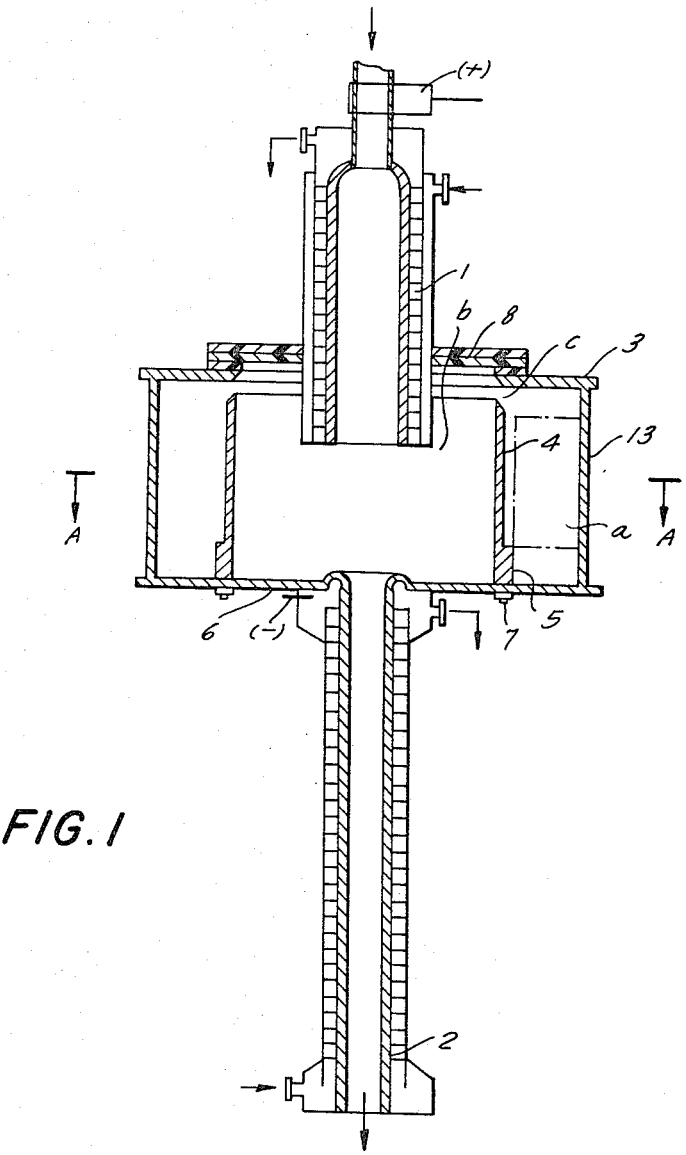
FIGURE 1 is a schematic longitudinal sectional view through the reactor of this invention.

Referring now to the drawings, there is illustrated a reactor comprising an annular chamber $a$, defined between an external cylindrical wall 13 and an internal, adjustable cylindrical jacket 4. The hydrocarbon gases enter the reactor through a tangentially extending inlet pipe 9, thus assuming a rotational movement in chamber $a$. The hydrocarbon gases then enter a central chamber $b$ through a slit $c$, the width of which is adjustable by lowering or raising the cylindrical jacket 4 by means of an adjusting device, illustrated in FIG. 3, which will be described further in detail below.

An upper tubular electrode 1 is supported on a disc 8 of insulating material having preferably non-refractory properties, such as, for example, Pertinax, Textolite, etc. Pertinax is an electric insulating material usually in the form of plates which comprise several sheets of paper. Each sheet is impregnated with Bakelite.

Textolite is an electric insulating material usually in the form of plates which are composed of several layers of fabric that are impregnated with Bakelite.

The disc 8 is mounted on the cover 3 of the chamber $a$.

The reactor is provided with a bottom 6, from which there extends the lower tubular electrode 2.

Both electrodes are surrounded by water-cooling jackets having a plurality of coils, adapted to increase the velocity of the water or other suitable cooling liquid, which circulates therethrough. The cooling liquid and the hydrocarbon gases travel in the direction of the arrows of FIGURES 1 and 2.

Figure 3:
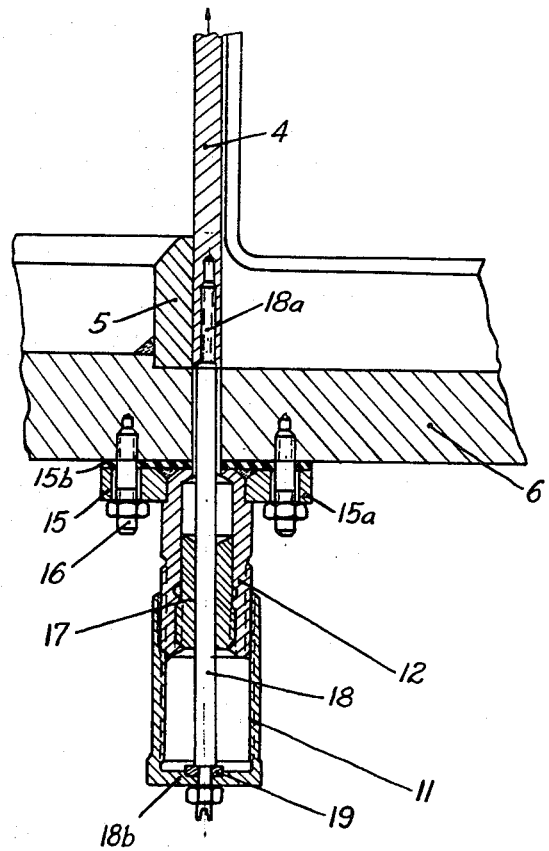
FIGURE 3 is a detailed sectional view illustrating the adjusting mechanism for the cylindrical jacket.
Figure 4:
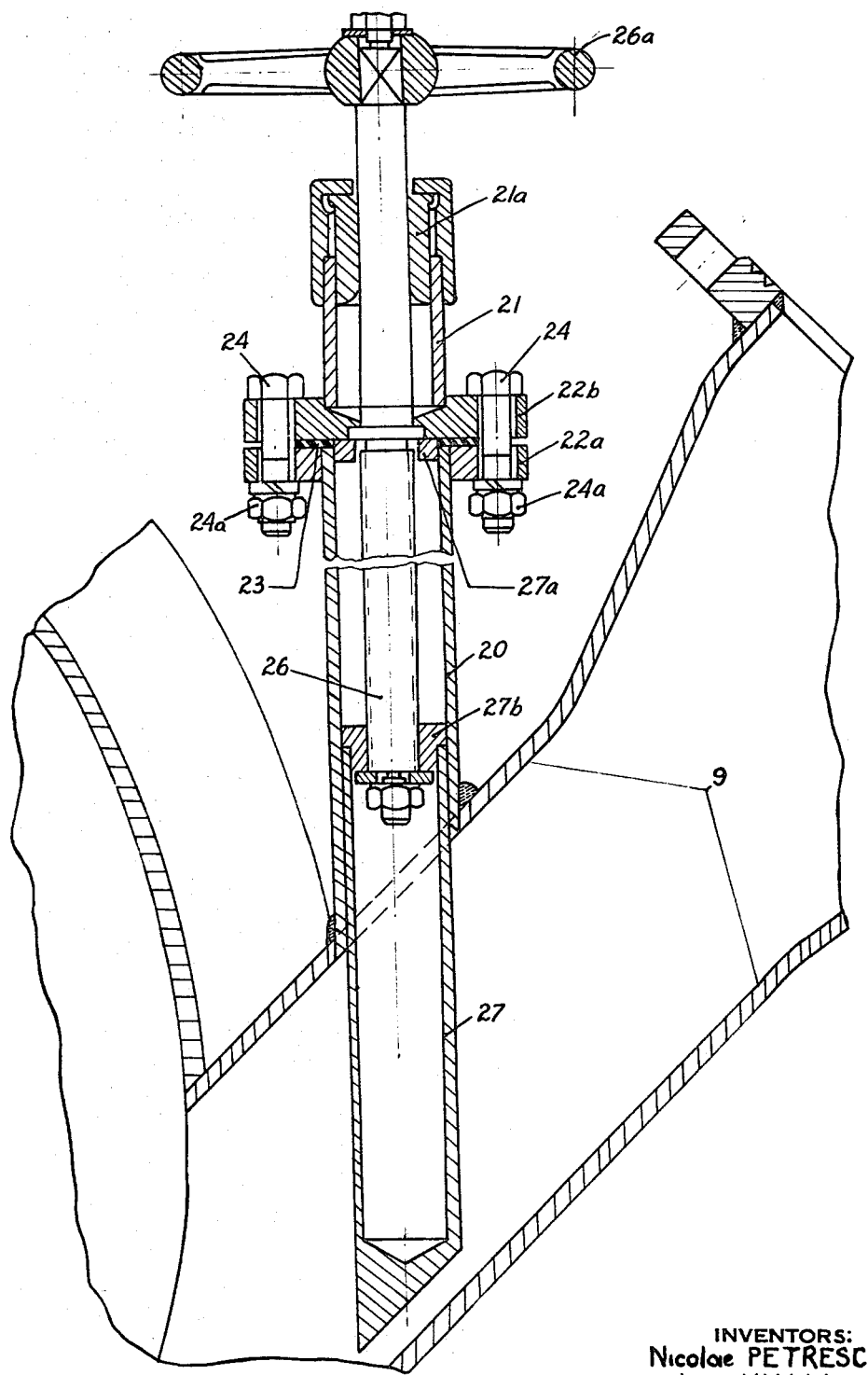
FIGURE 4 is a detailed sectional view illustrating the slide valve in the inlet pipe of the reactor.

The adjusting device for the cylindrical jacket 4 comprises a ring-guide member 5, which is welded or otherwise secured to the bottom 6. Three adjusting-bolt arrangements 7 (only two are illustrated in FIG. 1) are operatively mounted on the bottom 6. Referring to FIG. 3, each adjusting bolt arrangement comprises a shaft portion 12, which is externally and internally threaded. A flange 15 is welded to the shaft portion 12. The flange has a plurality of holes 15a, through which threaded bolts 16 extend. The bolts 16 are threadably secured in mating holes of the bottom 6. Nuts 14 serve to firmly secure the shaft portion 12 to the bottom 6 via the flange 15. Preferably a suitable washer 15b is disposed between the flange 15 and the bottom 6. An internal guide 17 is threadably mounted inside the shaft portion 12. A bolt 18 extends axially through the guide 17. The bolt 18 has at its forward end a threaded portion 18 $a$, which extends into a mating hole of the cylindrical jacket 4. A position-indicator member 11 is threadably secured over the lower end of the shaft portion 12. The member 11 has at its bottom an axial hole through which a thinned portion 18b of the bolt 18 extends. A key 19 is mounted in a suitable opening, in the bottom of member 11, and is disposed between the bolt 18 proper and the said bottom of member 11; thus the bolt 18 and the member 11 turn jointly. A recess is provided at the lower end of bolt 18 for permitting the turning thereof by means of a suitable tool. When the bolt 18 is rotated, the cylindrical jacket 14 is selectively lowered or raised due to the threaded connection between the jacket 4 and the bolt 18. The exact position of the jacket 4 will be indicated on the outer surface of the shaft portion 12, where suitable indicia are provided by means of the member 11, which turns jointly with bolt 18 on a corresponding thread of the shaft portion 12. Thus equal adjustments of all three adjusting bolt arrangements can be easily obtained. The ring guide 5 bears against the cylindrical jacket 4 thereby providing for a gas-tight joint.

Figure 2:
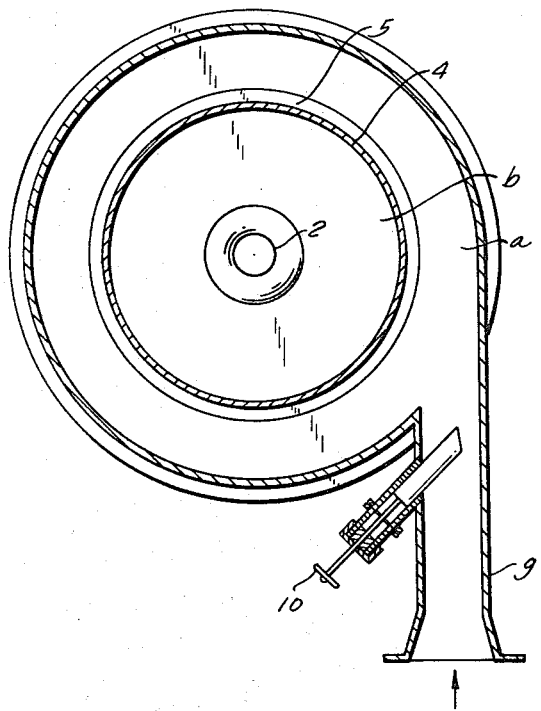
FIGURE 2 is a schematic horizontal sectional view along line A—A of FIGURE 1.

A slide valve 10 is mounted in the inlet pipe 9, which has a rectangular cross-sectional configuration (FIG. 2). The slide valve comprises the usual outer rectangular portion 20, which is preferably welded to the pipe 9. The rectangular portion 20 is secured to a second tubular portion 21 by means of a double rectangular flange arrangement 22a, 22b between which there extends a rectangular washer 23; and through suitable mating holes there extend bolts 24, which secure the flanges 22a, 22b to each other by means of nuts and lock washers 24a. The shaft 26 axially extends through the portions 20 and 21. The lower portion of the shaft 26 is threaded. A threaded portion 21a is secured to the upper end of tubular portion 21. The shaft 26 is provided at its exterior end with an adjusting wheel 26a and is connected at its interior end to a rectangularly shaped valve member 27. There are disposed in the shafts 20 and 21 the usual packings 27a, 27b. By turning the adjusting wheel 26a the opening defined by the valve member 27 in the pipe 9 is selectively adjusted and thereby the flow of the hydrocarbon gases in the pipe 9 is also adjusted.

The hydrocarbon gases enter from the annular chamber $a$ via an annular adjustable slit $c$ into the central chamber $b$ and exit therefrom via the tubular electrode 2. The slit $c$ is defined between two opposite knife edges which respectively form part of the cover 3 and the cylindrical jacket 4. Since the width of the slit $c$ can be adjusted by a vertical adjustment of the cylindrical jacket 4 by means of the adjusting devices, one of which is illustrated in FIG. 3, the now rotational flow of the hydrocarbon gases from the chamber $a$ to the chamber $b$ can be also adjusted.

The electric arc which forms inside chamber $b$ of the reactor emanates from the upper electrode 1, generally about 20 cm. from its lower edge, and contacts the lower electrode 2 generally in its lower region. This arc supplies the necessary heat for the reaction. The electric arc is usually about 1 meter long and, with the exception of its contact areas and the immediate proximity thereto, the electric arc is relatively quite thin, in the order of a few millimeters, acetylene being formed in the annular space around the electric arc beginning in chamber $b$ and continuing down to the lower portion of the electrode 2 where most of the acetylene is produced.

The electric arc formed in chamber $b$ should preferably be substantially centered in chamber $b$, while simultaneously varying slightly but continuously its contact surfaces with respect to the electrodes 1 and 2 in order to prevent the fusing and the rapid destruction of the latter.

Thus, the hydrocarbon gases attain a rotational movement which favors a proper stabilization of the electric arc. The hydrocarbon gases are transformed in the reactor into reaction gases containing about 13–17% acetylene mixed with hydrogen, and with a part of the non-reacted hydrocarbons, in accordance with the nature of the hydrocarbon gases which are used as a raw material in the reaction.

The two adjusting means of the reactor of this invention, namely the means for adjusting the width of the slit $c$ and the means for adjusting the flow of hydrocarbon gases in the pipe 9 can, when properly adjusted, effect a rotational movement of the reacting gases, thereby providing an optimum centering and stabilization of the electric arc.

It should be noted that it is particularly important for the electric arc to attain the optimum length and shape, while burning continuously at the same time. The rotational movement of the gases in the reactor is one of the conditions favoring the foregoing. Furthermore, it is also important for reasons set forth above that the contact areas between the electric arc and the electrodes 1 and 2 vary continuously. All of the aforedescribed optimum conditions can be favored by the proper adjustment of the two adjusting means, namely the cylindrical jacket 4 and the slide valve 10. When the reactor of the invention is properly adjusted the electric arc will become elastically suspended between the electrodes 1 and 2 so as to move up and down therein with a very high frequency. Thus, by continuously changing the points of contact between the electric arc and the electrodes the latter remain relatively cool and do not melt.

Thus, the two adjusting devices are instrumental in creating in the reactor of this invention the optimum conditions for different inputs of hydrocarbon gas compositions, or for different types of electric current rectifiers. The required adjustments can be carried out while the apparatus is in operation. With the exception of the upper electrode 1, which is supported on insulating material, the entire reactor is grounded so that the adjustments can be carried out during the operation of the reactor without any danger of getting electric shocks.

Although our invention has been illustrated and described wtih reference to one preferred embodiment thereof, we wish to have it understood that it is in no way limited to the details of such embodiment but is capable of numerous modifications within the scope of the appended claims.

Having thus fully disclosed our invention, what we claim is:

1. A reactor for producing acetylene by electrocracking hydrocarbon gases introduced into said reactor, comprising in combination, outer cylindrical wall means, a first cover on said outer cylindrical wall means supporting thereon a first electrode, a second cover on said outer cylindrical wall means opposite said first cover having mounted thereon a second electrode, inlet pipe means extending substantially tangentially from said outer cylindrical wall means and being adapted to introduce hydrocarbon gases into said reactor in a substantially tangential direction, outlet means operatively mounted on said outer cylindrical wall means, valve means operatively mounted in said inlet pipe means for adjusting the flow of hydrocarbon gases therethrough, inner cylindrical wall means coaxially and adjustably mounted on said second cover and extending toward said first cover, thereby the free edge of said inner cylindrical wall means and said first cover defining therebetween an annular adjustable inlet opening, and the inner and outer cylindrical wall means further defining therebetween an annular chamber means for connecting said first and second electrodes to a source of electric power for causing an electric discharge across said first and second electrodes; whereby, when said first and second electrodes are connected to said source of electric power causing said discharge and hydrocarbon gases are introduced into said reactor via said inlet pipe, acetylene is formed in said reactor and exits together with reaction gases and non-reacted gases via said outlet means.

2. The reactor for producing acetylene by electrocracking hydrocarbon gases as set forth in claim 1, wherein said outer and inner cylindrical wall means are vertical and said first and second cover are horizontal.

3. The reactor for producing acetylene by electrocracking hydrocarbon gases as set forth in claim 2, wherein at least a portion of said first cover consists of an insulating material having non-refractory properties.

4. The reactor for producing acetylene by electrocracking hydrocarbon gases as set forth in claim 3, wherein said insulating material is a phenol formaldehyde resin laminate.

5. The reactor for producing acetylene by electrocracking hydrocarbon gases as set forth in claim 3, wherein said second electrode is of tubular shape and also functions as said outlet means.

6. The reactor for producing acetylene by electrocracking hydrocarbon gases as set forth in claim 5, wherein said first electrode is of tubular shape.

7. The reactor for producing acetylene by electrocracking hydrocarbon gases as set forth in claim 6, wherein said first and second electrodes include water jacket cooling means operatively mounted thereon and adapted to cool said electrodes during operation of said reactor.

8. The reactor for producing acetylene by electrocracking hydrocarbon gases as set forth in claim 7, wherein the free edge of said inner cylindrical wall means which defines said annular adjustable inlet opening comprises a relatively sharp knife edge.

9. The reactor for producing acetylene by electrocracking hydrocarbon gases as set forth in claim 8, including a plurality of bolts which are threadably mounted in said inner cylindrical wall means and are operatively connected to said second cover and are adapted to reciprocally move the former toward and away from said first cover thereby adjusting the width of said annular adjustable inlet opening, and indicating means operatively and axially connected to said plurality of bolts for indicating the positions of the free edge of said inner cylindrical wall means relative to said first cover.

10. The reactor for producing acetylene by electrocracking hydrocarbon gases as set forth in claim 9, wherein said valve means comprise an adjustable slide valve which is adapted to control the tangential speed of the hydrocarbon gases flowing into said annular chamber via said inlet pipe.

References Cited

UNITED STATES PATENTS 3,328,276  6/1967  Schmidt et al. _____ 204—171

ROBERT K. MIHALEK, *Primary Examiner.*

U.S. Cl. X.R.

204—171